F. S. SEE & G. G. SIMONSON.
HARROWS.
No. 195,661. Patented Sept. 25, 1877.
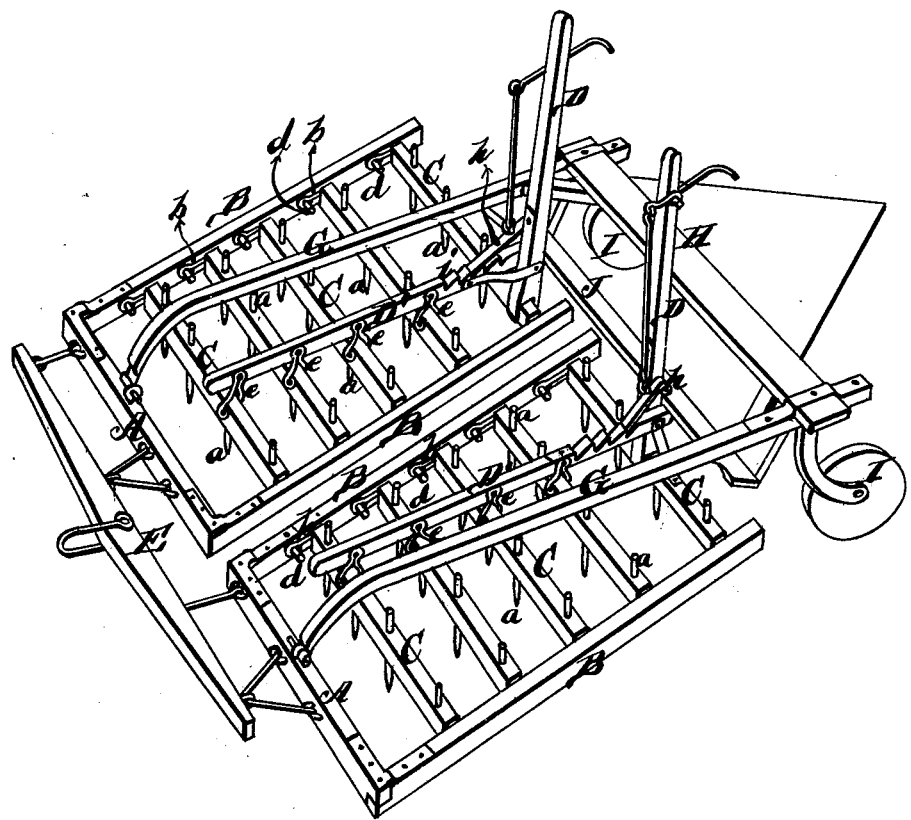

UNITED STATES PATENT OFFICE.

FILER S. SEE AND GEORGE G. SIMONSON, OF PRAIRIE HOME, KANSAS.

IMPROVEMENT IN HARROWS.

Specification forming part of Letters Patent No. 195,661, dated September 25, 1877; application filed July 28, 1877.

*To all whom it may concern:*

Be it known that we, FILER S. SEE and GEORGE G. SIMONSON, of Prairie Home, in the county of Republic and State of Kansas, have invented a new and valuable Improvement in Harrows; and we do hereby declare that the following is a full, clear, and exact description of the construction and operation of the same, reference being had to the annexed drawing, making a part of this specification, and to the letters and figures of reference marked thereon.

The figure of the drawings is a representation of perspective view of our harrow.

The nature of our invention consists in the construction and arrangement of a sectional self-cleaning and riding harrow, as will be hereinafter more fully set forth.

The annexed drawing, to which reference is made, fully illustrates our invention.

Our harrow is made in two or more sections, each section consisting of a front sill, A, with two parallel side sills, B B, extending rearward from its ends and inclined, as shown.

Between these side sills is a series of bars, C C, running parallel with the front sill A, and each bar provided with a series of teeth, a.

Each bar C is hung to the inner sides of the side sills B B in front of it by means of arms b b extending forward from the ends of the bar and placed upon pins d d in said sills, so that the bars are located in rear of the line of its axis or the journals upon which it can turn. The rear bar C of each section is provided with an upwardly-extending lever, D, to which a bar, D', is pivoted, and all the other bars C are connected to this bar D' by links or arms e e.

The bar D' is at its rear end provided with ratchet-teeth i, into which takes a pawl, h, pivoted to the lever D.

By means of the lever D and the connecting-bar D' all the bars C are operated simultaneously to set the teeth a at any angle desired. By throwing the lever D forward, it will be seen that, by the peculiar method of hinging the toothed bars, said bars with their teeth are raised or elevated above the side sills B, so that in going to or from a field there is nothing down on the ground but the sills or frame A B of each section.

The sections of the harrow are, by suitable links, connected to an evener, E, substantially as shown.

To the front sills A of the harrow-sections are hinged curved arms G G, which extend rearward over the harrow, and, in rear thereof, are connected by a platform, H, which forms the driver's seat, and is supported by suitable caster-wheels I I.

In hangers under the arms G G is suspended the foot-rest J.

This harrow is very simple in construction, and is easily operated. It adapts itself to any inequalities in the ground, and the teeth can be set at any angle desired. The toothed bars rising at the same time as they roll will cause the teeth to clean themselves.

The riding attachment is durable, and, being supported upon two wheels, does not cause the bars to twist when turning, which is often the case when such attachment is supported by a single wheel.

What we claim as new, and desire to secure by Letters Patent, is—

1. The combination, with the side sills B having the pins d, of the transverse bars C provided with teeth a, and arms b b having eyes in their forward ends, which engage with said pins, substantially as described, and for the purpose set forth.

2. The side sills B having the pins d, in combination with the transverse toothed bars C, arms b b having eyes in their forward ends, bar D' having ratchet-teeth i, links e e, lever D, and pawl h, substantially as described, and for the purpose set forth.

3. The curved arms G G, hinged to the front sills A of the harrow-sections, in combination with the seat H, caster-wheels I I, and foot-rest J, substantially as described, and for the purpose set forth.

In testimony that we claim the above we have hereunto subscribed our names in the presence of two witnesses.

FILER S. SEE.
GEORGE G. SIMONSON.

Witnesses:
JOHN B. SIMONSON,
A. G. BROWN.